(12) United States Patent
Ido et al.

(10) Patent No.: US 7,139,810 B2
(45) Date of Patent: Nov. 21, 2006

(54) STORAGE SYSTEM WITH DATA REDUNDANCY BETWEEN STORAGE VOLUMES

(75) Inventors: Takeshi Ido, Odawara (JP); Mitsuru Kashiwagi, Yugawara (JP)

(73) Assignee: Hitachi, Ltd., Tokyo (JP)

( * ) Notice: Subject to any disclaimer, the term of this patent is extended or adjusted under 35 U.S.C. 154(b) by 368 days.

(21) Appl. No.: 10/626,454

(22) Filed: Jul. 23, 2003

(65) Prior Publication Data

US 2004/0128453 A1 Jul. 1, 2004

(51) Int. Cl.
*G06F 13/16* (2006.01)
*G06F 12/16* (2006.01)

(52) U.S. Cl. ............... 709/216; 711/148; 711/162; 714/5; 714/6

(58) Field of Classification Search ............... None
See application file for complete search history.

(56) References Cited

U.S. PATENT DOCUMENTS

| | | | |
|---|---|---|---|
| 4,310,883 A | | 1/1982 | Clifton et al. |
| 5,544,347 A | * | 8/1996 | Yanai et al. ............... 711/162 |
| 5,787,485 A | | 7/1998 | Fitzgerald et al. |
| 6,073,218 A | | 6/2000 | DeKoning et al. |
| 6,219,762 B1 | | 4/2001 | Hasegawa et al. |
| 6,247,099 B1 | | 6/2001 | Skazinski et al. |
| 6,434,675 B1 | | 8/2002 | Hasegawa et al. |
| 6,467,034 B1 | | 10/2002 | Yanaka |
| 6,480,953 B1 | | 11/2002 | Hughes |
| 6,490,659 B1 | | 12/2002 | McKean et al. |
| 6,574,709 B1 | | 6/2003 | Skazinski et al. |
| 6,584,473 B1 | | 6/2003 | Kimura et al. |
| 6,711,632 B1 | | 3/2004 | Chow et al. |
| 2003/0131068 A1 | | 7/2003 | Hoshino et al. |
| 2003/0212870 A1 | | 11/2003 | Nowakowski |
| 2003/0221077 A1 | | 11/2003 | Ohno et al. |
| 2004/0064633 A1 | | 4/2004 | Oota |
| 2004/0107325 A1 | | 6/2004 | Mori |

FOREIGN PATENT DOCUMENTS

| | | |
|---|---|---|
| EP | 997817 | 5/2000 |
| EP | 1333371 | 8/2003 |
| JP | 07-234811 | 9/1995 |
| JP | 2000-222267 | 8/2000 |
| JP | 2001-273342 | 10/2001 |

\* cited by examiner

*Primary Examiner*—B. James Peikari
(74) *Attorney, Agent, or Firm*—Townsend and Townsend and Crew LLP

(57) ABSTRACT

Embodiments of the present invention are directed to methods and systems of storing data in storage volumes while ensuring matching data redundancy between the storage volumes. In one embodiment, a system for storing data comprises a first storage area to store data; a second storage area to store data; a first storage control unit configured to control the first storage area; and a second storage control unit configured to control the second storage area. In response to a first write request issued to write data in the first storage area, the first storage control unit is configured to write data associated with the first write request to the first storage area and to transfer the first write request to the second storage control unit, and the second storage control unit is configured to write the data associated with the first write request to the second storage area. In response to a second write request issued to write data in the second storage area, the second storage control unit is configured to transfer the second write request to the first storage control unit.

19 Claims, 18 Drawing Sheets

I/O PROCESSING FLOWCHART
(JOB5: I/O PROCESSOR 502)

FIG.8 FLOWCHART OF PROCESSINGS BETWEEN PAIRED VOLUMES

FIG. 9  FLOWCHART OF PROCESSINGS BETWEEN PAIRED VOLUMES (ASYNCHRONOUS TRANSFER)

I/O PROCESSING FLOWCHART (JOB3: I/O PROCESSOR 508)

I/O PROCESSING FLOWCHART (JOB4: I/O PROCESSOR 503)

FIG.16 FLOWCHART OF PROCESSINGS BETWEEN PAIRED VOLUMES

I/O PROCESSING FLOWCHART (ANY OF MAIN AND SUB)

STORAGE SYSTEM WITH DATA REDUNDANCY BETWEEN STORAGE VOLUMES

CROSS-REFERENCES TO RELATED APPLICATIONS

This application is based on and claims the benefit of Japanese Patent Application No. 2002-326257, filed on Nov. 11, 2002, the entire disclosure of which is incorporated herein by reference in its entirety.

BACKGROUND OF THE INVENTION

The present invention relates to a plurality of storage systems, in each of which a pair of storage volumes are formed, thereby multiplexing data. More particularly, the present invention relates to a technique for accepting access requests from both of a main host computer and a sub-host or backup computer while matching data redundancy is kept between those storage volumes.

In each of the storage systems developed in recent years, many of storage control units and/or storage volumes connected to such storage control units are mirrored so that such processings as online jobs, etc. that have been executed in those systems are restored quickly from errors and/or disasters that might occur in them. If such a mirrored configuration is taken for a part or the whole of a storage system, it will also be effective for maintenance works of the system.

One of the methods for forming each storage volume in such a dual configuration is to connect each of two storage control units connected to two host computers to a main volume or subvolume. When the main host computer writes data in the main volume, the storage control unit copies the data from the main volume to the subvolume. The state between the main volume and the subvolume after such a copy operation is referred to a mirrored state. The backup computer cannot access any subvolume in such a mirrored state. Such a method is disclosed in JP-A No.273242/2001

In the prior art, it has been impossible for a sub-host or backup computer to access to any mirrored storage volume until the mirrored state is reset. In other words, the sub-host or backup computer cannot access any storage volume while the storage volume is in a mirrored state.

BRIEF SUMMARY OF THE INVENTION

Embodiments of the present invention are directed to methods and systems of storing data in storage volumes while ensuring data redundancy between the storage volumes. In specific embodiments, the storage volumes include a main volume of a main storage system and a subvolume of a sub-storage system. Under such circumstances, it is a feature of the invention to provide a method for enabling both the main computer in the main storage system and sub-host or backup computer in the sub-storage system to perform I/O processings for both of the main volume and the subvolume as if the host computers share one and the same storage volume while data redundancy between the main volume and the sub-storage volume is kept in the storage systems in a dual configuration.

Furthermore, it is another feature of the present invention to provide a method for enabling both of the main host computer and the backup computer to perform I/O processings for any storage volume as if the host computers share the volume.

In order to achieve the above objects, the present invention provides each subvolume with a communication volume. A sub-storage control unit transfers a write request or I/O processing request that is a read request issued from a backup computer to the main storage control unit as an I/O processing for the main volume, which is the main storage volume, through the communication volume. The main storage control unit then transfers the received I/O processing request to the subvolume just like an I/O processing request issued from the main host computer.

In accordance with an aspect of the present invention, a system for storing data comprises a first storage area to store data; a second storage area to store data; a first storage control unit configured to control the first storage area; and a second storage control unit configured to control the second storage area. In response to a first write request issued to write data in the first storage area, the first storage control unit is configured to write data associated with the first write request to the first storage area and to transfer the first write request to the second storage control unit, and the second storage control unit is configured to write the data associated with the first write request to the second storage area. In response to a second write request issued to write data in the second storage area, the second storage control unit is configured to transfer the second write request to the first storage control unit.

In accordance with another aspect of the invention, a method of storing data in storage devices comprises, in response to a first write request issued to write data in a first storage area, using a first storage control unit to write data associated with the first write request to the first storage area and transferring the first write request to a second storage control unit to write the data associated with the first write request to a second storage area. The method further comprises, in response to a second write request issued to write data in the second storage area, transferring the second write request from the second storage control unit to the first storage control unit prior to writing data associated with the second write request to the second storage area.

In accordance with another aspect of this invention, a system for storing data comprises a first storage area to store data; a second storage area to store data; a first storage control unit configured to control the first storage area, the first storage control unit including a first connection to connect with a first host system; a second storage control unit configured to control the second storage control unit, the second storage control unit including a second connection to connect with a second host system; a first path through which data is transferred between the first connection and the first storage area; a second path through which data is transferred between the first storage area and the second storage control unit; a third path through which data is transferred between the second storage control unit and the second storage area; and a fourth path through which data is transferred between the second connection and the first storage control unit.

In accordance with another aspect of the present invention, a system for storing data comprises a first storage area to store data; a second storage area to store data; a first storage control unit configured to control the first storage area; and a second storage control unit configured to control the second storage area. In response to a first write request issued to write data in the first storage area and if the first storage area has a status which is neither reserved nor exclusive, the first storage control unit is configured to obtain an exclusive status of the first storage area and to write data associated with the first write request to the first storage area, and to transfer the first write request to the second storage control unit to obtain an exclusive status of the second storage area, and the second storage control unit is configured to write the data associated with the first write request received from the first storage control unit to the second storage area. In response to a second write request issued to write data in the second storage area and if the second storage area has a status which is neither reserved nor exclusive, the second storage control unit is configured to transfer the second write request to the first storage control unit.

In accordance with another aspect of the invention, a method of storing data in storage devices comprises, in response to a first write request issued to write data in a first storage area and if the first storage area has a status which is neither reserved nor exclusive, using a first storage control unit to obtain an exclusive status of the first storage area and to write data associated with the first write request to the first storage area, and transferring the first write request to a second storage control unit to obtain an exclusive status of the second storage area and to write the data associated with the first write request to the second storage area. The method further comprises, in response to a second write request issued to write data in the second storage area and if the second storage area has a status which is neither reserved nor exclusive, transferring the second write request from the second storage control unit to the first storage control unit.

In accordance with another aspect of this invention, a system for storing data comprises a first storage area to store data; a second storage area to store data; a first storage control unit configured to control the first storage area, the first storage control unit including a first connection to connect with a first host system; a second storage control unit configured to control the second storage area, the second storage control unit including a second connection to connect with a second host system; a first path through which data is transferred between the first connection and the first storage area, after the first storage control unit obtains an exclusive status of the first storage area; a second path through which data is transferred between the first storage control unit and the second storage control unit; a third path through which data is transferred between the second storage control unit and the second storage area, after the second storage control unit obtains an exclusive status of the second storage area; and a fourth path through which data is transferred between the second connection and the first storage control unit, if the second storage area has a status which is neither reserved nor exclusive so that the second storage control unit can obtain an exclusive status of the second storage area.

DETAILED DESCRIPTION OF THE INVENTION

Figure 18:
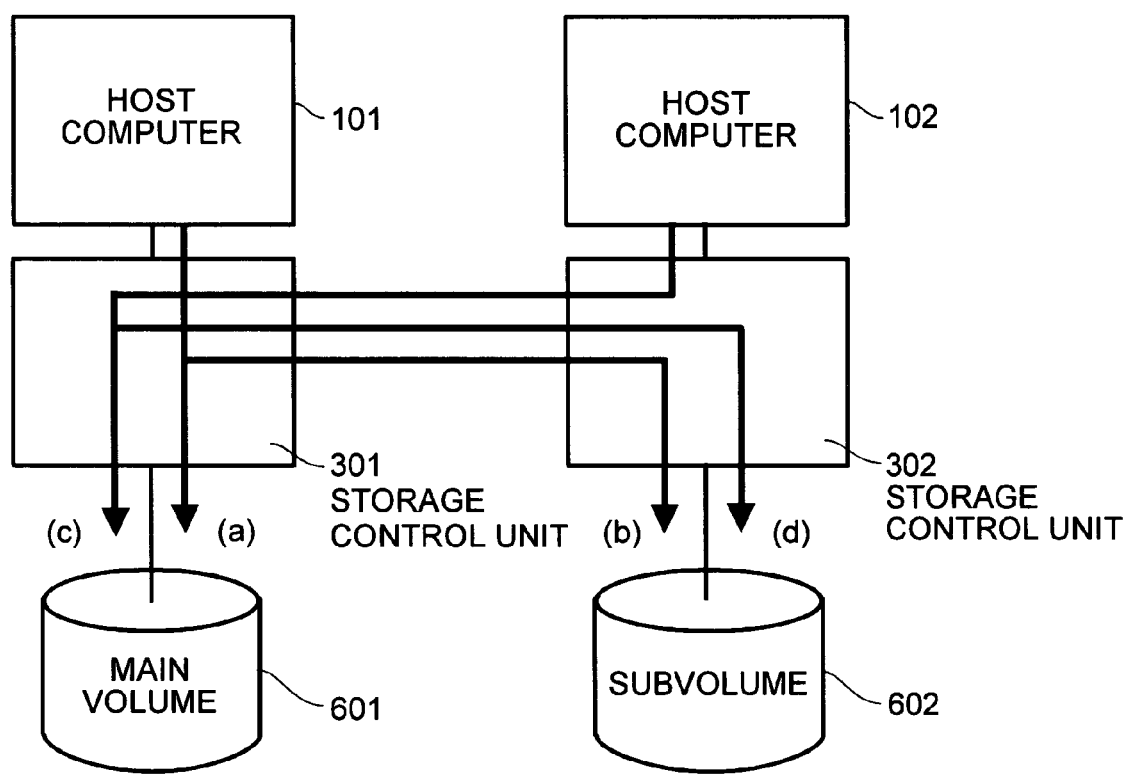
FIG. 18 is a diagram illustrating the operational principles of the present invention.

FIG. 18 shows a diagram which illustrates the principles of the present invention. In a storage system shown in FIG. 18, if a main host computer 101 performs an I/O processing for a main volume 601, a main storage control unit 301 receives the I/O processing from the host computer 101, then performs the I/O processing for the main volume 601 (a).

Furthermore, the main storage control unit 301 transfers the I/O processing received from the main host computer 101 to the sub-storage control unit 302. The sub-storage control unit 302 then performs the I/O processing for the subvolume 602 (b).

On the other hand, if the sub-host or backup computer 102 performs an I/O processing for the subvolume 602, the sub-storage control unit 302 receives the I/O processing from the host computer 102 and transfers the I/O processing to the main storage control unit 301. The main storage control unit 301 then performs the I/O processing for the main volume 601 (c).

Furthermore, the main storage control unit 301 returns the received I/O processing to the sub-storage control unit 302.

Then, the sub-storage control unit 302 performs the I/O processing for the subvolume 602 (*d*).

Each of the main volume 601, the subvolume 602, and the communication volume 603 is actually configured by one or more recording media. The recording media may be magnetic disks, optical disks, etc. In particular, when the RAID (Redundant Array for Inexpensive Disks) method is employed for such recording media, the main/sub-storage control unit performs an I/O processing sent to a logical volume from a host computer for a plurality of disks corresponding to the logical volume.

Figure 1:
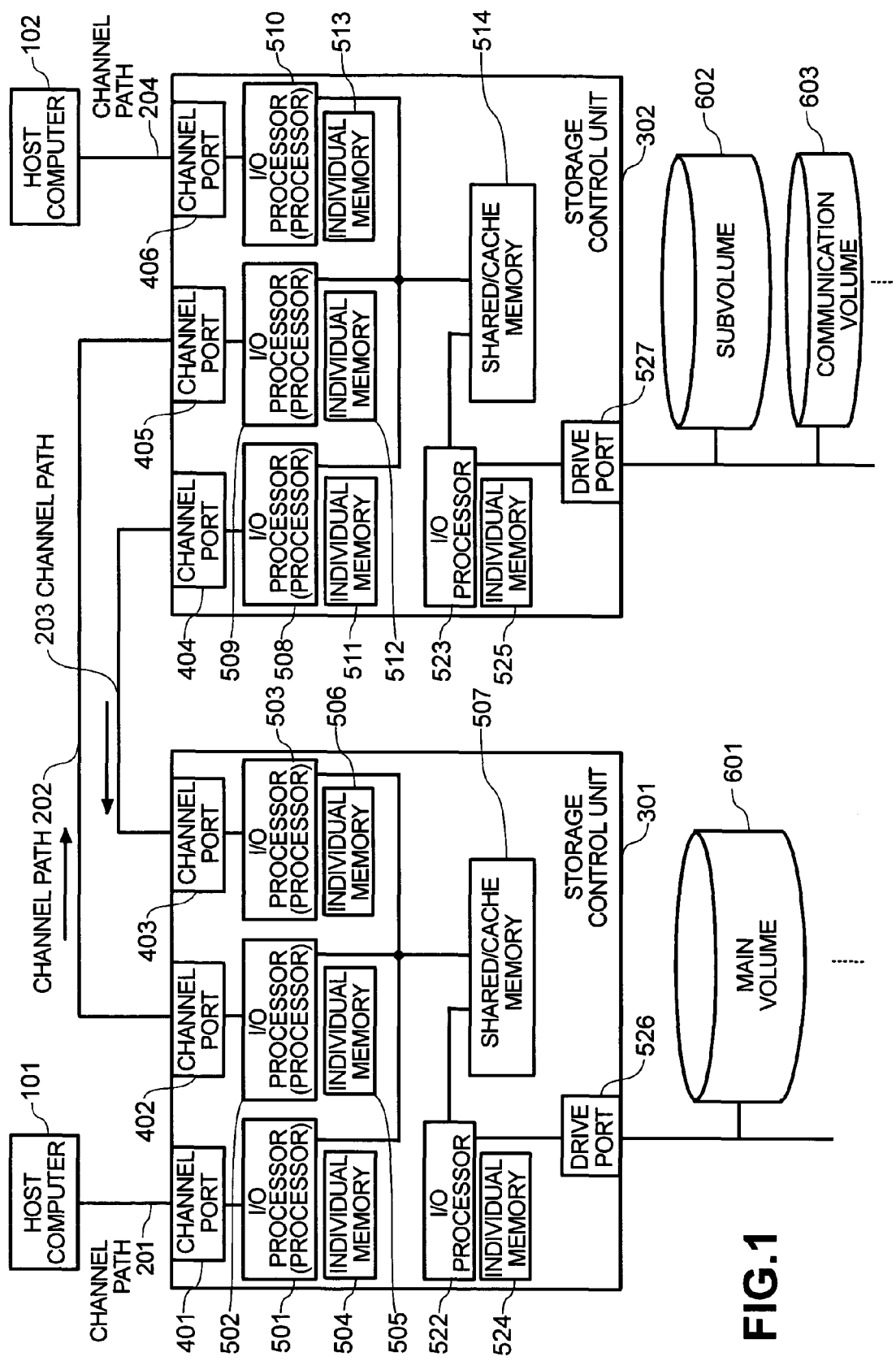
FIG. 1 is a block diagram of a storage system in the first example of the present invention.

FIG. 1 shows a block diagram of a storage system in the first example of the present invention. The principles of the present invention shown in FIG. 18 are illustrated in detail in FIG. 1. In the storage system shown in FIG. 1, a storage control unit 301 is connected to a host computer 101 through a channel path or a first connection 201. The storage control unit 301 performs I/O processings requested from the host computer 101. The storage control unit 301 includes channel ports 401 to 403, I/O processors 501 to 503, and individual memories 504 to 506 provided for the processors 501 to 503, a shared/cache memory 507 accessible from the I/O processors 501 to 503 that perform I/O processings through channel ports 401 to 403, a drive port 526, an I/O processor 522 for writing/reading data in/from a main volume 601, and an individual memory 524 provided for the processor 522. The drive port 526 is connected to the main volume 601.

The configuration of the storage control unit 302 is the same as that of the storage control unit 301. The control unit 302 is connected to the host computer 102 through the channel path or second connection 204 and used to control I/O processings requested from the host computer 102. The control unit 302, configured similarly to the control unit 301, has a communication volume 603. This is the only difference between the storage control unit 302 and the storage control unit 301.

The communication volume 603 is used to transfer I/O processings received from the host computer 102 to the storage control unit 301.

The storage control units 301 and 302 are connected to the channel ports 402 and 405 through the channel path 202 and to the channel ports 403 and 404 through the channel path 203 respectively, thereby the main volume 601 and the subvolume 602 are mirrored. The channel paths 202 and 203 are one-way paths. In this first example, however, the channel paths 202 and 203 are mirrored. Consequently, when the host computer 101 issues a request of an I/O processing request for the main volume 601 to the storage control unit 301, the control unit 301 transfers the I/O processing to the subvolume 602 mirrored with the main one 601 through the channel path 202 and the storage control unit 302.

On the other hand, if the host computer 102 issues a request of an I/O processing for the subvolume 602 to the storage control unit 302, the I/O processor 523 of the storage control unit 302 performs a processing for the communication volume 603 first without performing the I/O processing for the subvolume 602.

After that, the storage control unit 302 transfers the I/O processing request to the storage control unit 301 through the channel path 203 so that the I/O processing is performed for the main volume 601. The I/O processor 503 of the storage control unit 301, after receiving the I/O processing request from the control unit 302, performs the processing for the main volume 601. The storage control unit 301 then transfers the I/O processing request to the storage control unit 302 through the channel path 202 so that the I/O processing is performed for the subvolume 602. The control unit 302 thus performs the I/O processing for the subvolume 602.

Figure 2:
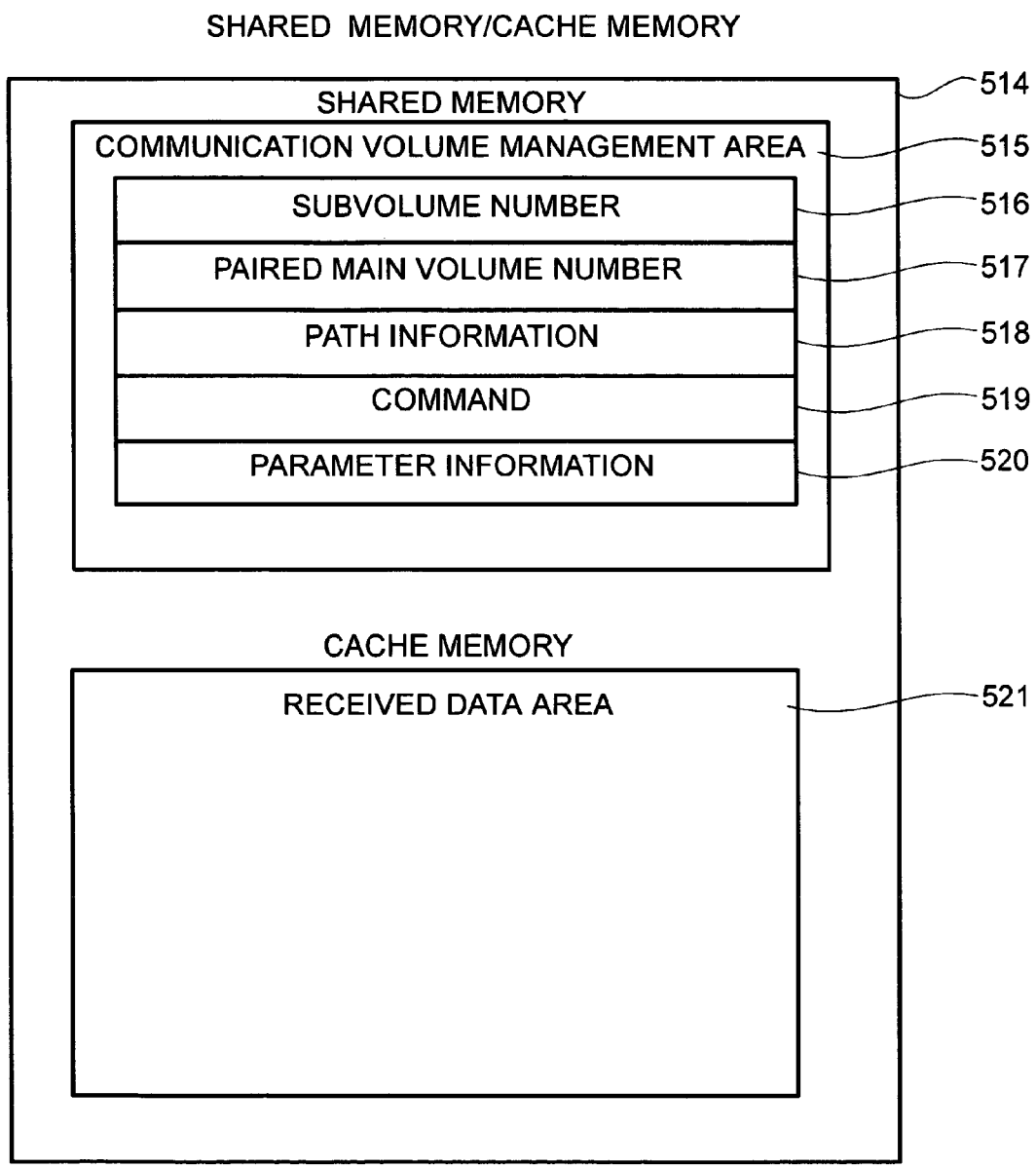
FIG. 2 is a configuration of a shared/cache memory for storing information required to transfer I/O processings.
Figure 3:
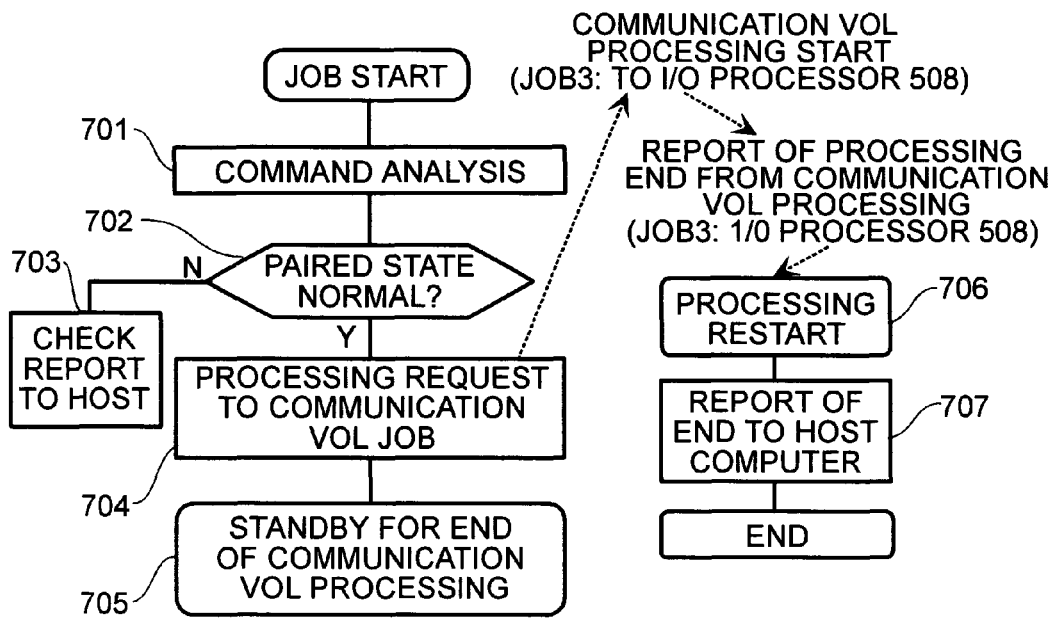
FIG. 3 is a flowchart of the processings performed by an I/O processor 510 in the first example of the present invention.

FIG. 2 shows a chart that illustrates the management information retained in the shared/cache memory 514 of the storage control unit 302. When the host computer 102 issues a request of an I/O processing for the subvolume 602, the I/O processor 510 stores, the subvolume number 516, the command 519, and the parameter information 520 in the communication volume management area 515 located in the shared/cache memory 514.

The I/O processor 510, upon receiving a write request from the host computer 102, stores the data received from the host computer 102 in the received data area 521 located in the shared/cache memory 514. Then, the processor 510 passes control to the I/O processor 508 so that the processing is performed for the communication volume 603. The processor 508, upon receiving control, obtains the corresponding mirrored main volume number 517 and the path information 518 from the subvolume number 516 to calculate the destination to which the I/O processing is transferred. After that, the I/O processor 508 issues a command 519 to the I/O processor 503 of the storage control unit 301 through the channel path 203 so that the I/O processing target is changed from the communication volume 603 to the main volume 601, then transfers the parameter information 521 to the processor 503. When the I/O processing is for a write operation, the processor 508 also transfers the data received from the host computer 102 and stored in the received data area 521.

On the other hand, separately from the processings by the I/O processors 508 to 510, the I/O processor 523, if write data is found in the received data area 521, writes the data in the communication volume 603.

FIGS. 3 through 7 show flowcharts of the processings with respect to FIGS. 1 and 2. The flowcharts differ between the I/O processing for the main volume 601 and that for the subvolume 602 and between the I/O processing requested from the main host computer 101 and that requested from the backup computer 102. I/O processings are divided into two types: writing and reading. For a write I/O processing requested from the host computer 102, the storage control unit 302 transfers the I/O processing to the storage control unit 301. For a write I/O processing requested from the storage control unit 301, the control unit 302 writes the data in the subvolume 602.

Next, a description will be made for the processings by the I/O processor 510 (JOB1). If the storage control unit 302 receives an I/O request from the host computer 102, the I/O processor 510 makes a command analysis (step 701). The processor 510 then decides whether or not it is possible to transfer the data, that is, whether or not the mirrored state is set normally (step 702). When the mirrored state is not normal, it denotes that matching data redundancy between the main volume and the subvolume is lost. Consequently, the processor 510 sends a signal to the host computer 102 about the abnormal mirrored state (check report) (step 703). If the mirrored state is normal, the processor 510 issues an I/O processing request to the JOB3 of the communication volume (step 704). The processor 510 (JOB1) thus enters the standby state (step 705). The processing is restarted when the communication volume JOB3 is terminated (step 706). The processor 510 then reports the end of the processing to the host computer 102 (step 707).

Next, a description will be made for the processings by the I/O processor 508 (JOB3). If the I/O processor 508 receives an I/O processing request from the I/O processor

510 (JOB1), the processor 508 (JOB3) sets the main volume information 517 and the path information 518 (step 713), then issues a command to the storage control unit 301 according to the information prepared (step 714). Consequently, the processing by the I/O processor 503 (JOB4) is started. At first, the processor 508 transfers parameter information, then data (step 715). After the transfer ends, the processor 508 (JOB3) enters the standby state (step 716).

When the data transfer ends, the I/O processor 503 of the storage control unit 301 reports the end of JOB4 to the I/O processor 508. Consequently, the processor 508 (JOB3) is restarted (step 717) and reports the end of the processing to the I/O processor 510 (JOB 1) (step 718).

Figure 6:
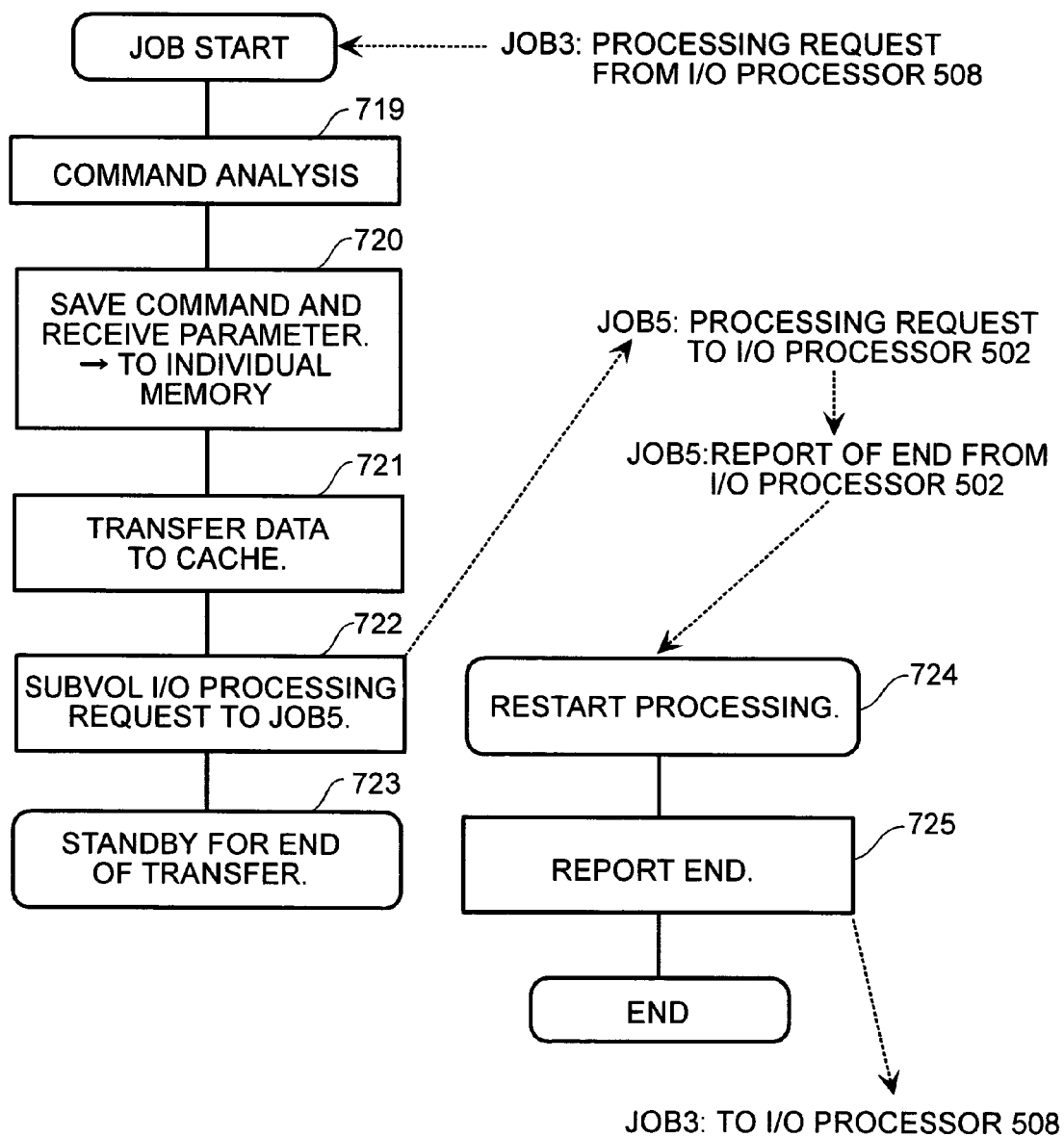
FIG. 6 is a flowchart of the processings performed by an I/O processor 503 in the first example of the present invention.

Next, a description will be made for the processings by the I/O processor 503 (JOB4) started in response to an I/O processing request from the I/O processor 508 (JOB3) with reference to FIG. 6. At first, the processor 503 makes a command analysis in JOB4 started in response to an I/O processing request (step 719). Then, the processor 503 saves both command and parameter in the individual memory 506 (step 720). In this example, the command and the parameter may also be saved in the shared/cache memory 507. The processor 503 then transfers data to the shared/cache memory 507 (step 721). In other words, the data transferred by the processor 503 to the shared/cache memory 507 at that time is the data generated by the requested write processing.

After that, the I/O processor 503(JOB4) requests an I/O processing to the I/O processor 502(JOB5)(step 722), thereby the I/O processor 503(JOB4) enters the standby state once (step 723). The JOB4 processing is restarted when the processor 503(JOB4) receives the end of the processing from the I/O processor 502(JOB5). The I/O processor 503 then reports the end of the processing to the I/O processor 508(JOB3) and terminates the processing. The data stored in the shared/cache memory 507 is written in the main volume 601 by the I/O processor 522.

Figure 7:
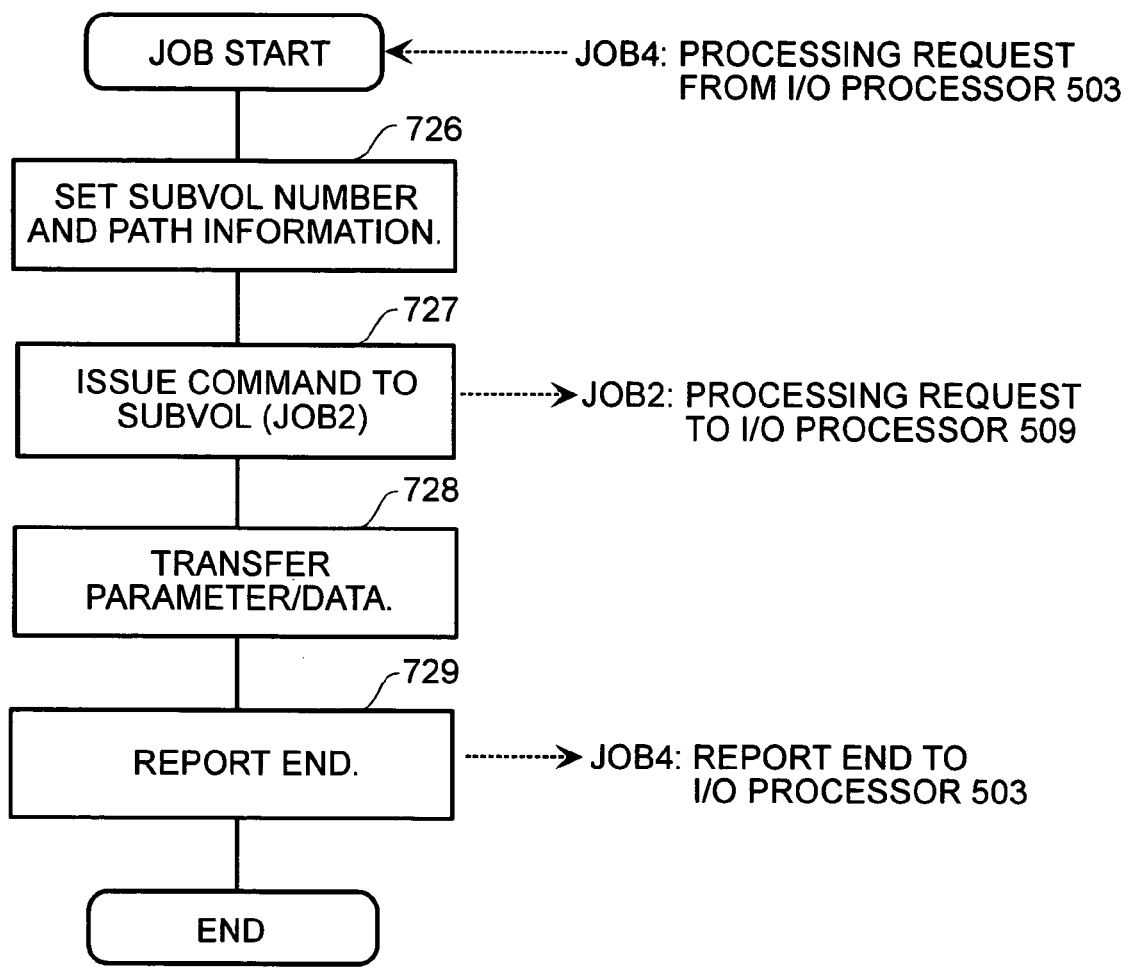
FIG. 7 is a flowchart of the processings performed by an I/O processor 502 in the first example of the present invention.

Next, a description will be made for a processing of the I/O processor 502(JOB5) started at an I/O processing request from the I/O processor 503(JOB4) with reference to FIG. 7. At first, the I/O processor 502 sets the subvolume number and the path information (step 726) and issues a command to the JOB2 that performs the I/O processing for the subvolume 602 (step 727). The I/O processor 502 then transfers the parameter/data to the JOB2 (step 728). When the transfer ends, the I/O processor 502 reports the end of the processing to the I/O processor 503(JOB4)(step 729).

If the data to be transferred is found in the shared/cache memory 514 of the storage control unit 302 in step 728, the data transfer is omissible. Consequently, the response to host computers is improved.

Figure 4:
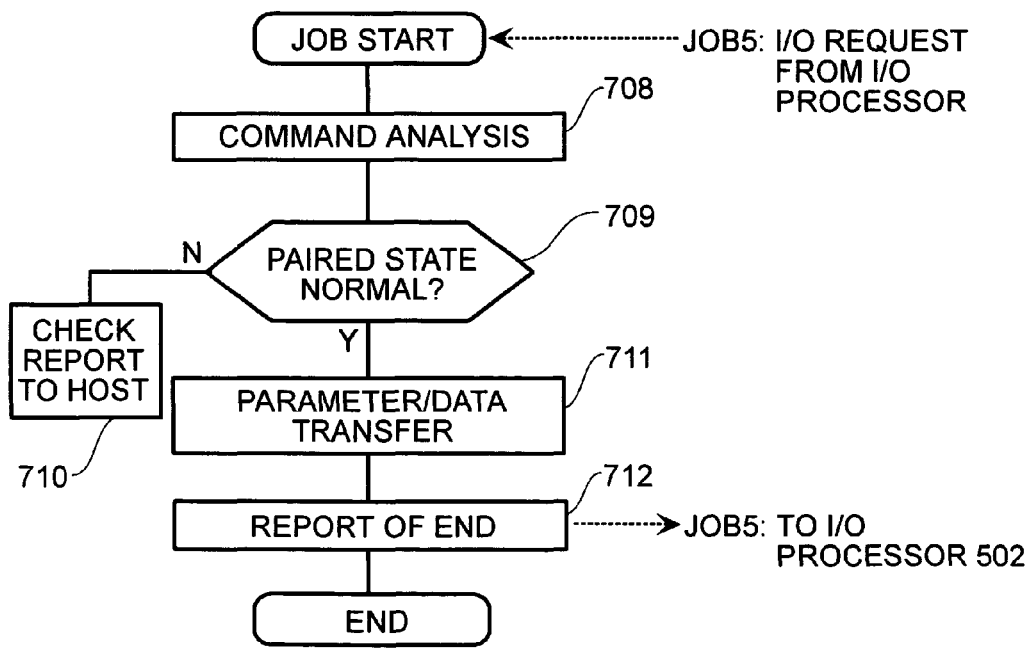
FIG. 4 is a flowchart of the processings performed by an I/O processor 509 in the first example of the present invention.
Figure 5:
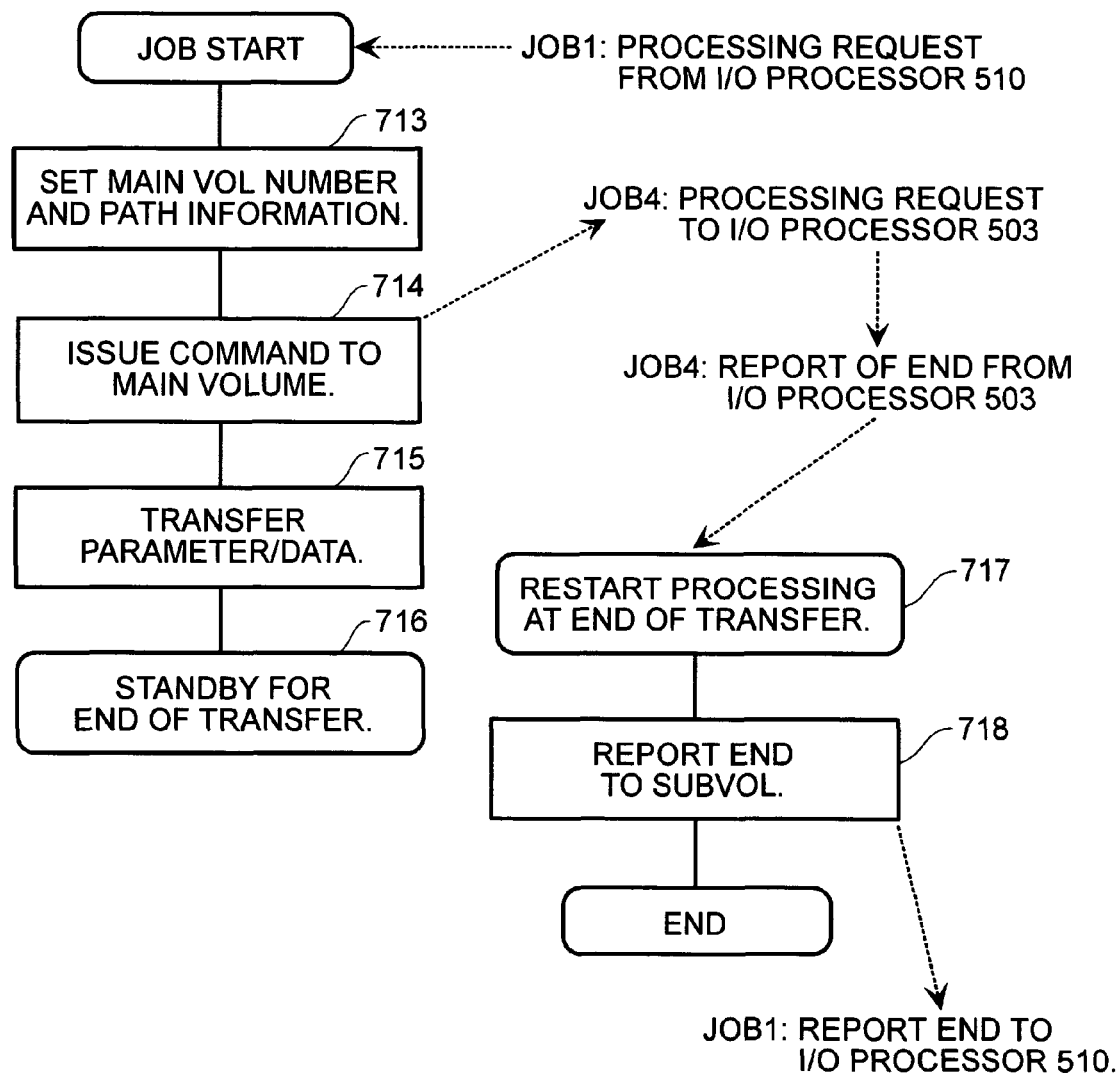
FIG. 5 is a flowchart of the processings performed by an I/O processor 508 in the first example of the present invention.

Finally, a description will be made for a processing of the I/O processor 509(JOB2) started at an I/O processing request from the I/O processor 502(JOB5) with reference to FIG. 4. When JOB2 is started, the I/O processor 509 makes a command analysis (step 708). The I/O processor 509 then checks the mirrored state (step 709). If the mirrored state is abnormal, data redundancy is lost from between the main volume and the subvolume. The I/O processor 509 thus makes a check report to the I/O processor 502(JOB5)(step 710). If the mirrored state is normal, the I/O processor 509 transfers the necessary command, parameter, and data (step 711) to the processor 502(JOB5). After that, the I/O processor 509 reports the end of the processing to the I/O processor 502 of the main storage control unit 301 (step 712) and terminates the processing.

If data to be transferred at that time is found in the shared/cache memory 514 of the storage control unit 302 in step 711, the data transfer is omissible.

Figure 8:
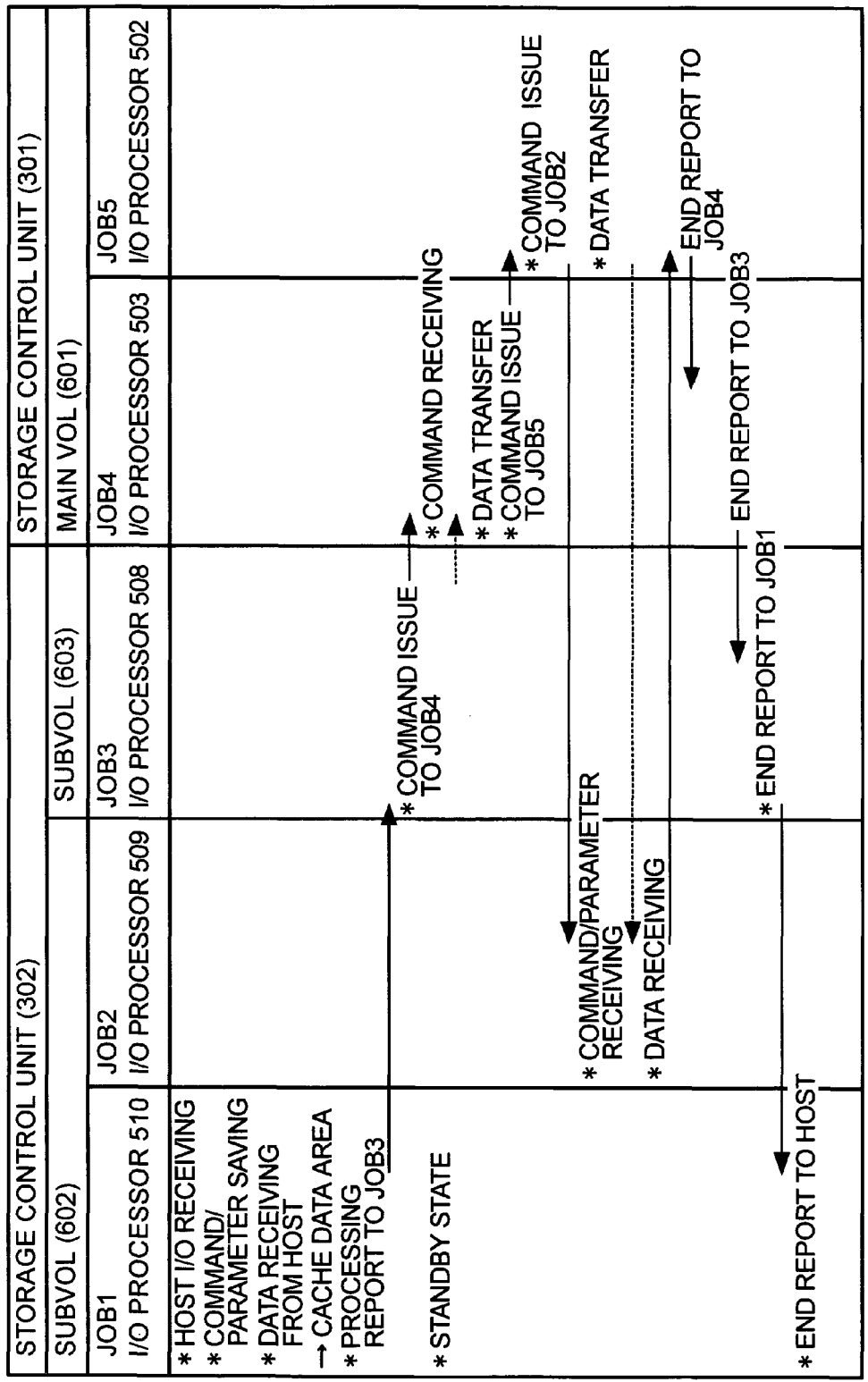
FIG. 8 is a sequential chart illustrating a relationship among the JOBs of I/O processors in the first example of the present invention.

FIG. 8 shows a sequential flow of the processes performed by the jobs (JOB) started in the subvolume 602, the communication volume 603, and the main volume 601 with use of a controlling method shows in FIGS. 3 through 7. In FIG. 8, the I/O processor 510(JOB1), when receiving an I/O request from the host computer 102, performs pre-processings such as receiving/saving the necessary command and parameter, receiving data from a host computer, and saves data in the cache memory. After that, the I/O processor 510(JOB1) requests the I/O processor 508(JOB3) to perform a processing for the communication volume 603, then enters the standby state. When the I/O processor 508(JOB3) is started, the I/O processor 510(JOB1) issues the necessary command to the I/O processor 503(JOB4) with respect to the processing for the main volume 601. When JOB4 is started in the I/O processor 503, the I/O processor 510(JOB1) performs pre-processings such as receiving/saving necessary command and data, as well as receiving data from the subvolume 602. After that, the I/O processor 502 issues a copy command to the I/O processor 509(JOB2) to copy data to the subvolume 602. The I/O processor 509(JOB2), after completing the data transfer, reports the end of the processing to the I/O processor 503(JOB4). Receiving the report, the I/O processor 503(JOB4) reports the end of the processing to the I/O processor 508(JOB3).

Subsequently, the I/O processor 508(JOB3) reports the end of the processing to the V/O processor 510(JOB1) while the I/O processor 510(JOB1) reports the end of the processing to the host computer 102. With this series of processings, the I/O processings are all completed while data redundancy between the main volume and the subvolume is kept.

While read I/O processings are also performed similarly in this example, it is also possible to read data directly from the subvolume 602 as follows. In this connection, at first, the host computer 101 reports the storage control unit 302 that a write request is issued to write data in the main volume 601. The write request is stored in the shared/cache memory 514, then the data is written in the main volume 601. The host computer 102 can thus read data from the subvolume 602 directly. Such reading from the subvolume 602, however, is done when the area from which data is read at a read request is not overlapped with any area in which data is written at a write request stored in the shared/cache memory 514. On the other hand, if a read area and a write area are overlapped with each other, the read request is transferred to the main volume 601 so that the data is read from the volume 601.

In the first example, because a communication volume is defined, each I/O processor of the storage control unit 302 does not need to distinguish between the communication volume and a subvolume. The processing of the I/O processor is thus simplified. Because the data redundancy between the main volume and the subvolume is kept, the user of the host computer 102 can perform I/O processings for any of the main volume and the subvolume; there is no need to distinguish between those main volume and subvolumes.

In this example, data can also be transferred asynchronously, that is, data transfer to a subvolume can be made asynchronously with an I/O processing in response to a write request from the host computer 102. While this second example is similar to the first example, some processings in the second example differ from those in the first example.

Figure 9:
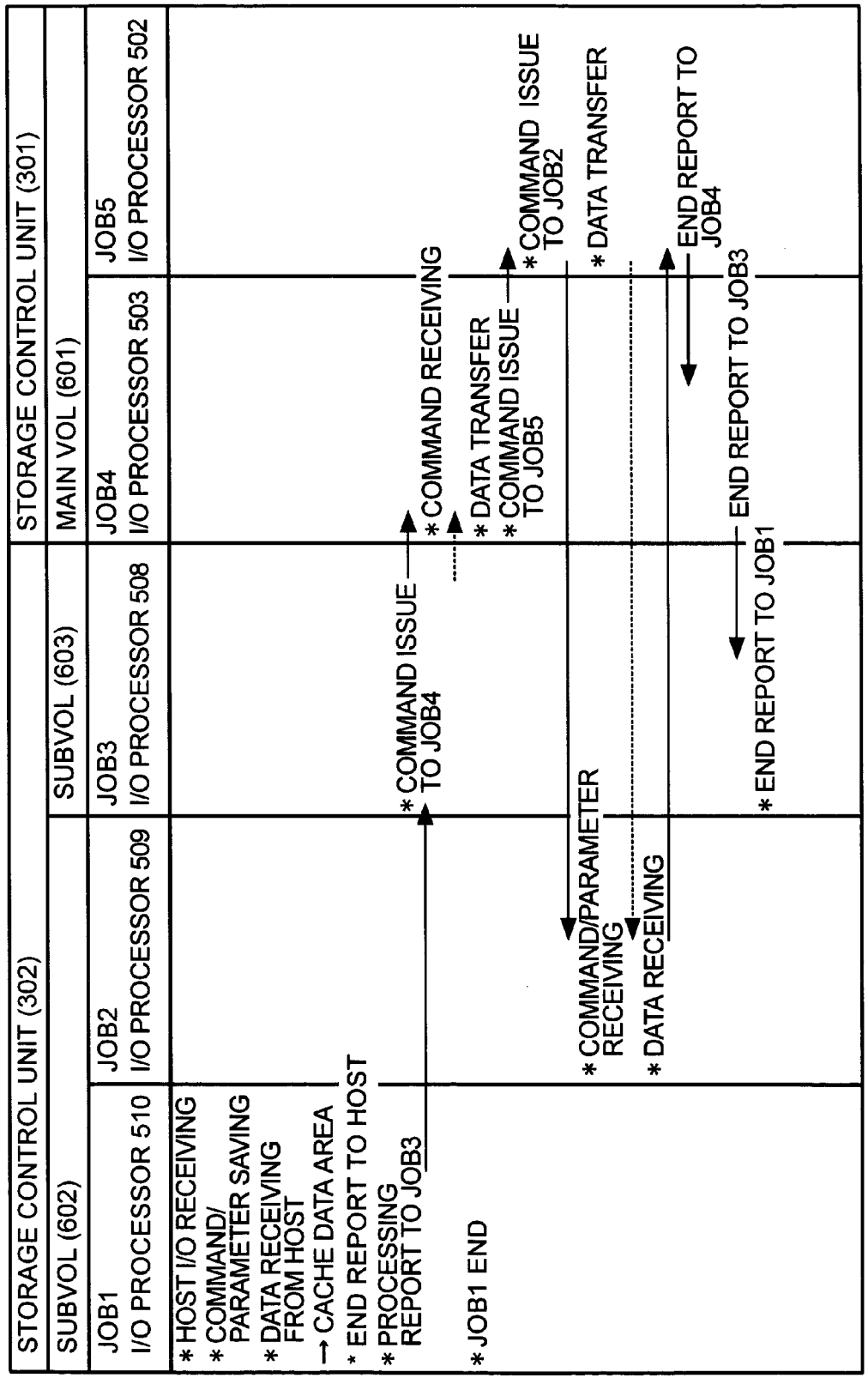
FIG. 9 is a sequential chart illustrating a relationship among the JOBs of I/O processors in the first example of the present invention.

FIG. 9 shows a sequential flow of data transfer processings by each I/O processor performed asynchronously as described above. Unlike the processings shown in FIG. 8, the I/O processor 510(JOB1) reports the end of processing to the host computer 102 before reporting the processing for the communication volume to the I/O processor 508(JOB3) in FIG. 9. The response to the host computer 102 in FIG. 9 is thus improved more than that in FIG. 8.

Figure 10:
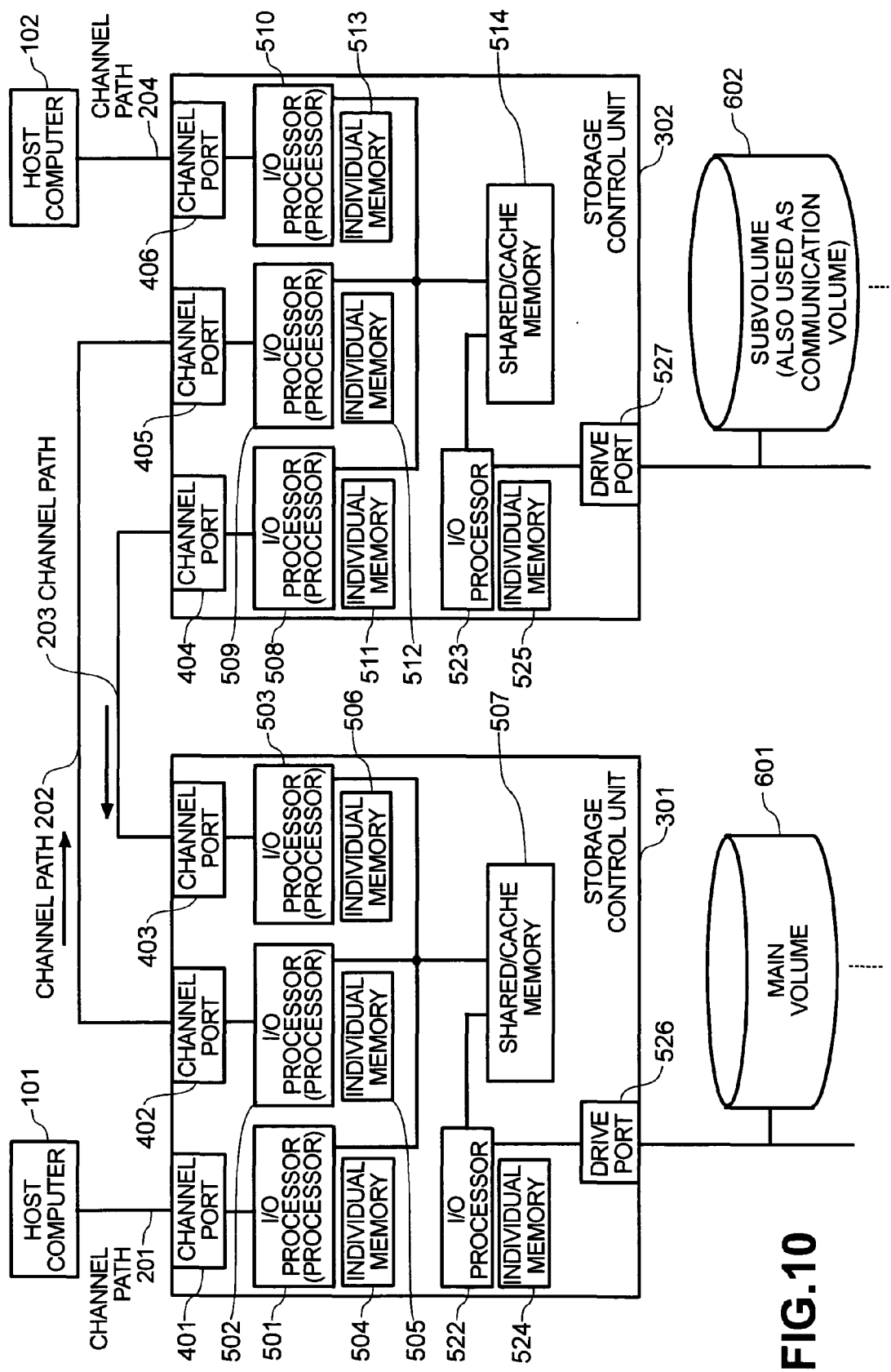
FIG. 10 is a block diagram of a storage system in the second example of the present invention.
Figure 11:
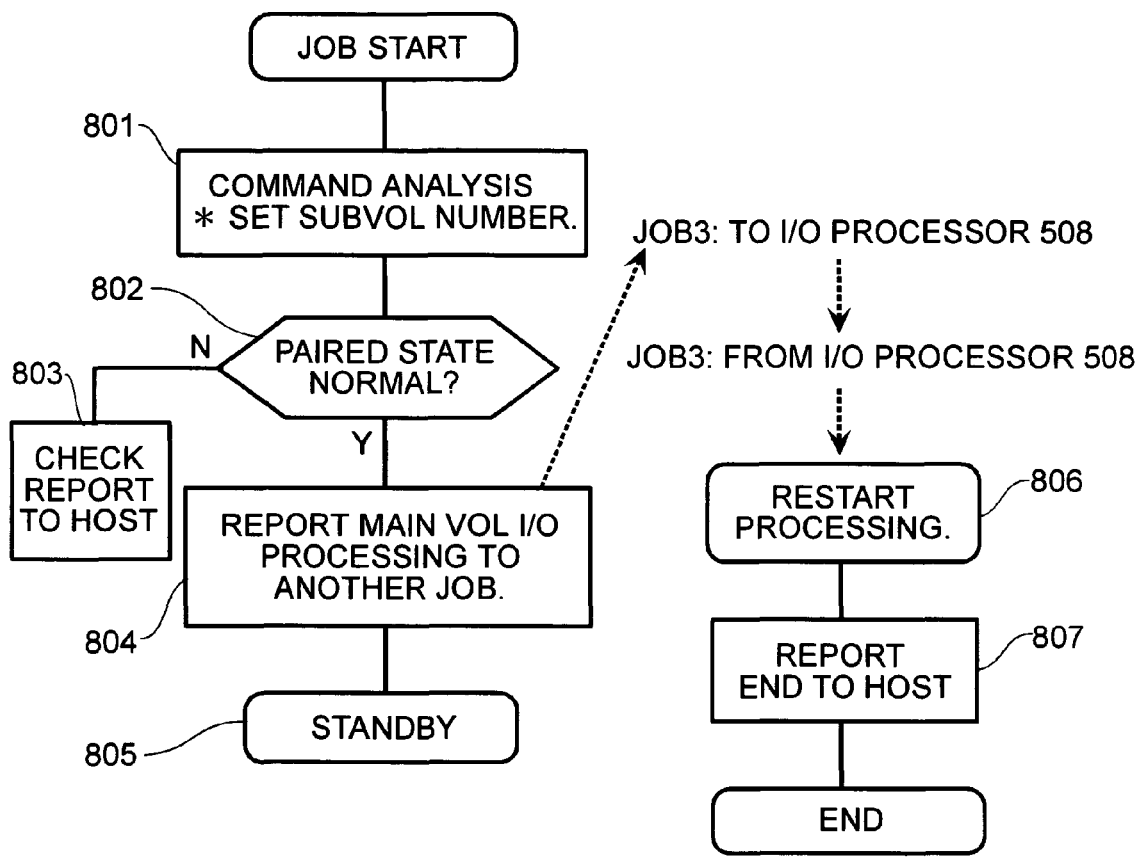
FIG. 11 is a flowchart of the processings performed by an I/O processor 510 in the second example of the present invention.
Figure 12:
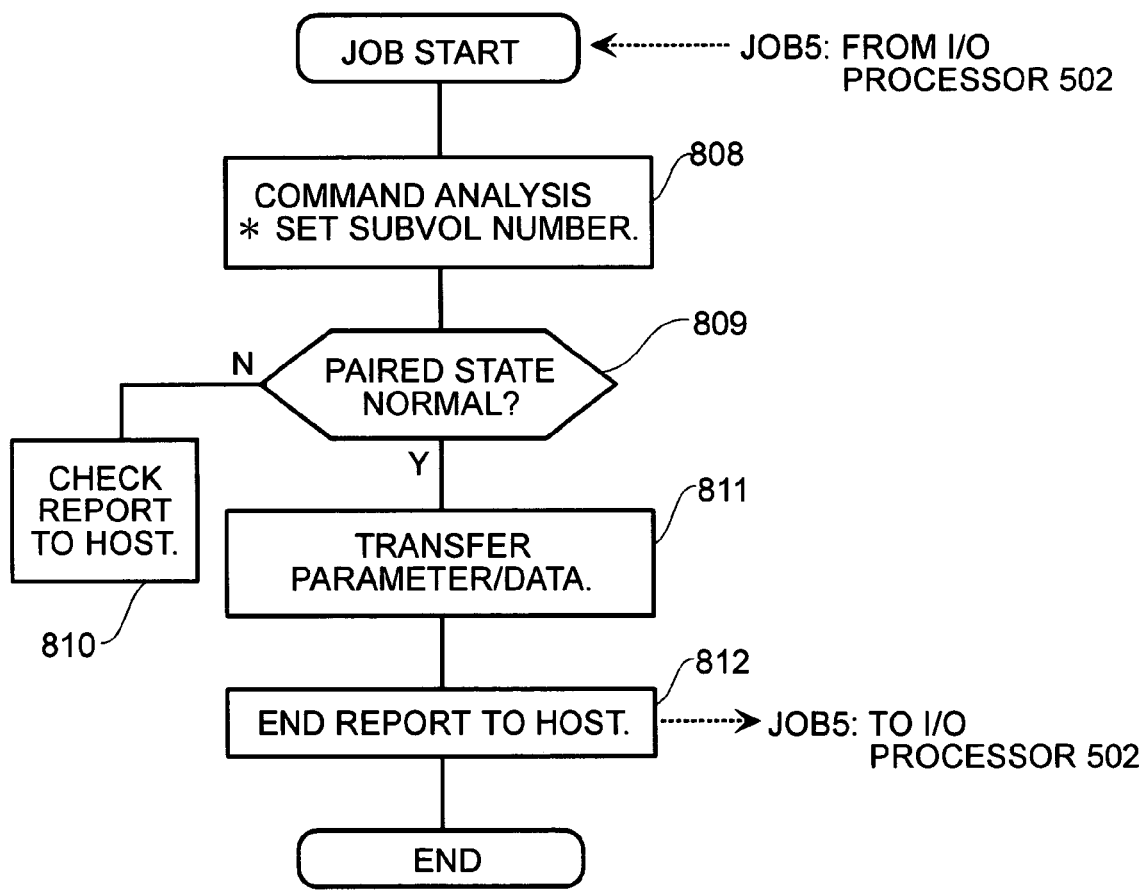
FIG. 12 is a flowchart of the processings performed by an I/O processor 509 in the second example of the present invention.
Figure 13:
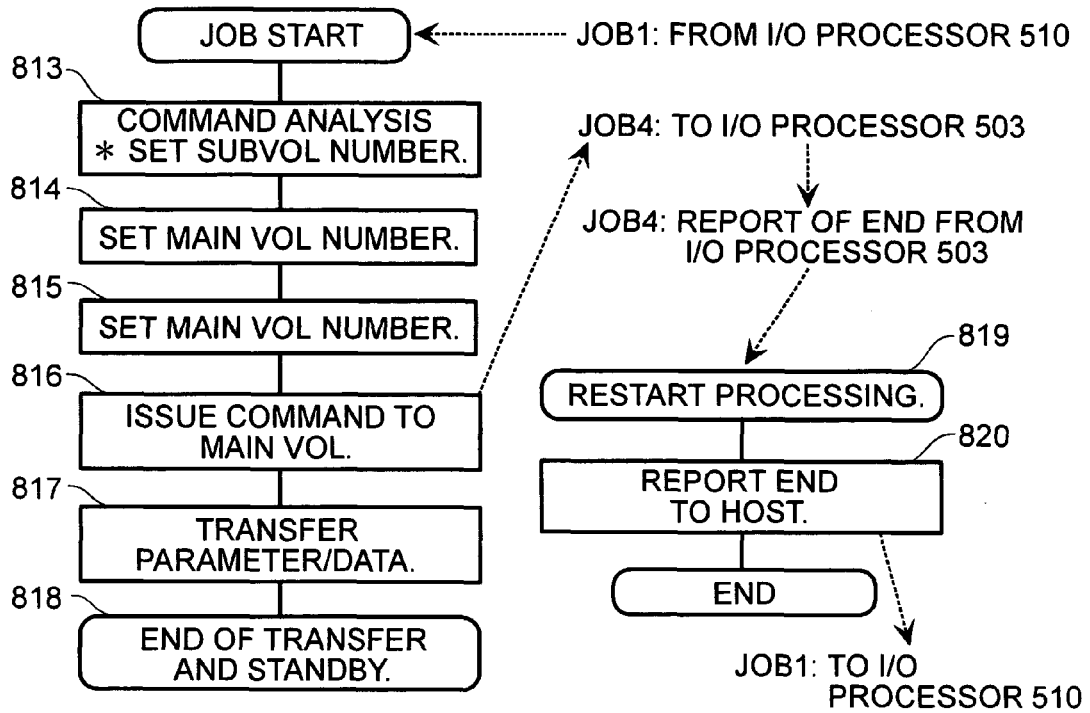
FIG. 13 is a flowchart of the processings performed by an I/O processor 508 in the second example of the present invention.
Figure 14:
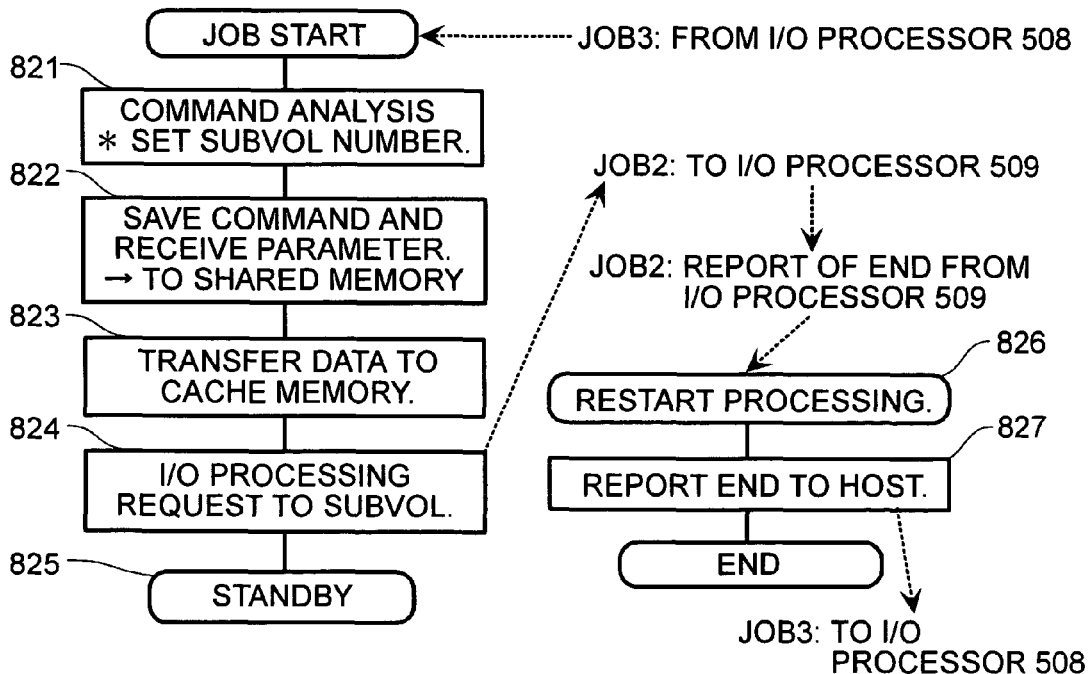
FIG. 14 is a flowchart of the processings performed by an I/O processor 503 in the second example of the present invention.
Figure 15:
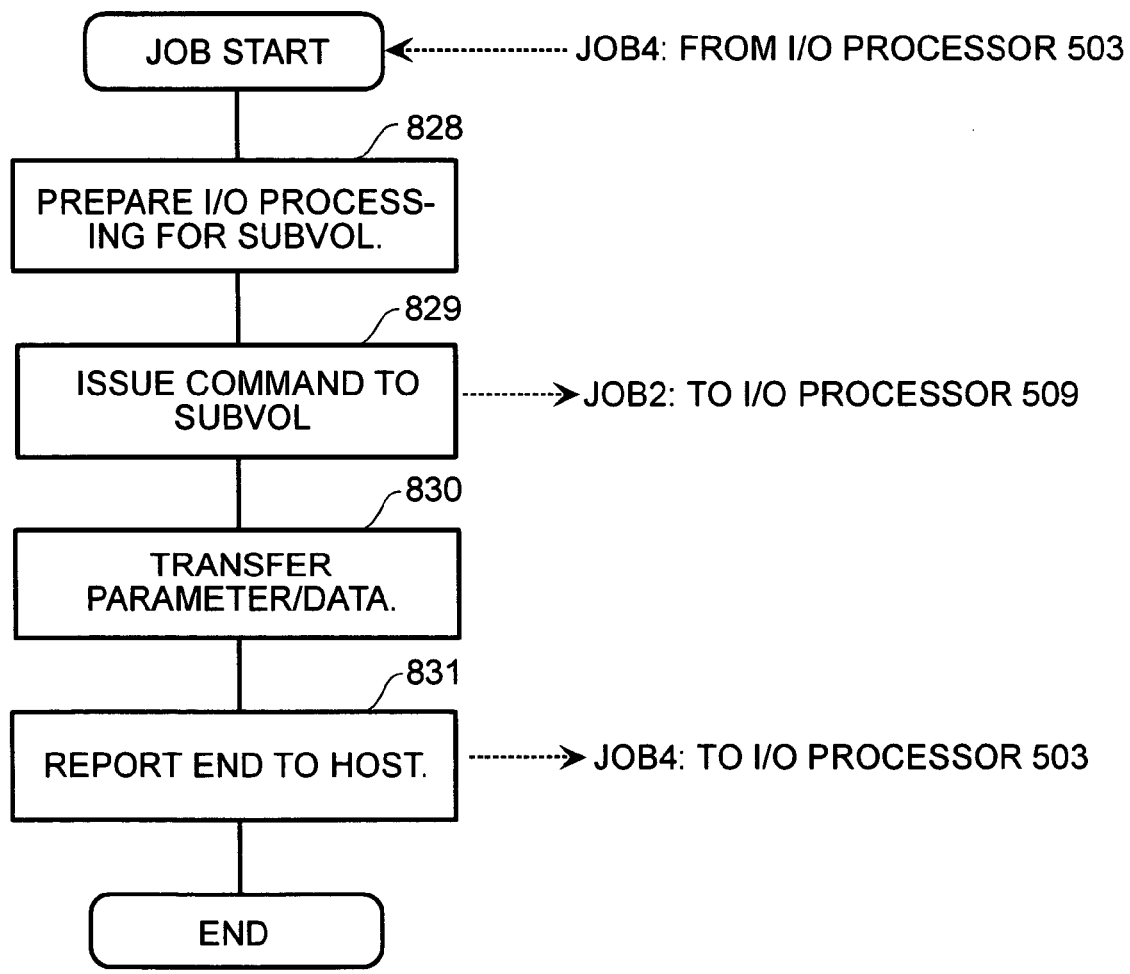
FIG. 15 is a flowchart of the processings performed by an I/O processor 502 in the second example of the present invention.

FIG. 10 shows a block diagram of a storage system in the second example of the present invention. In this second example, a subvolume 602 also functions as the communication volume 603 shown in FIG. 1. The storage system shown in FIG. 10 just differs from that shown in FIG. 1 in that the subvolume 602 does not transfer any I/O processing request to the JOB performed in the communication volume 603; instead, the I/O processing request is issued to another JOB in the subvolume 602. This second example is characterized by that a communication volume that does not function as a storage volume must be defined in FIG. 1. In FIG. 10, however, there is no need to define the communication volume 603. In the third example, there is no need to define the communication volume 603, so that the capacity of the communication volume 603 is added to the capacity of the subvolume 692.

FIGS. 11 through 15 show flowcharts for controlling the storage system configured as shown in FIG. 10. In FIGS. 11 through 15, an I/O processing of the subvolume 602 is transferred to the main volume 601 with use of another JOB in the same subvolume 602 and when the transfer ends, the end of the processing is reported to the host computer through the JOB of the subvolume 602.

The flow of the processings is similar to those shown in FIGS. 3 through 7, although there are the following differences between the two flows. Firstly, if an I/O processing is not to be performed for the main volume, another JOB of the subvolume 602 is requested to transfer the I/O processing for the main volume (step 804). Secondly, when it is decided that the I/O processing for the subvolume 602 is passed over (step 813), the necessary information is set (steps 814 and 815) just like in the JOB started in the communication volume, then a command is issued (step 816) and both parameter and data are transferred (step 817) to the main volume 601.

Figure 16:
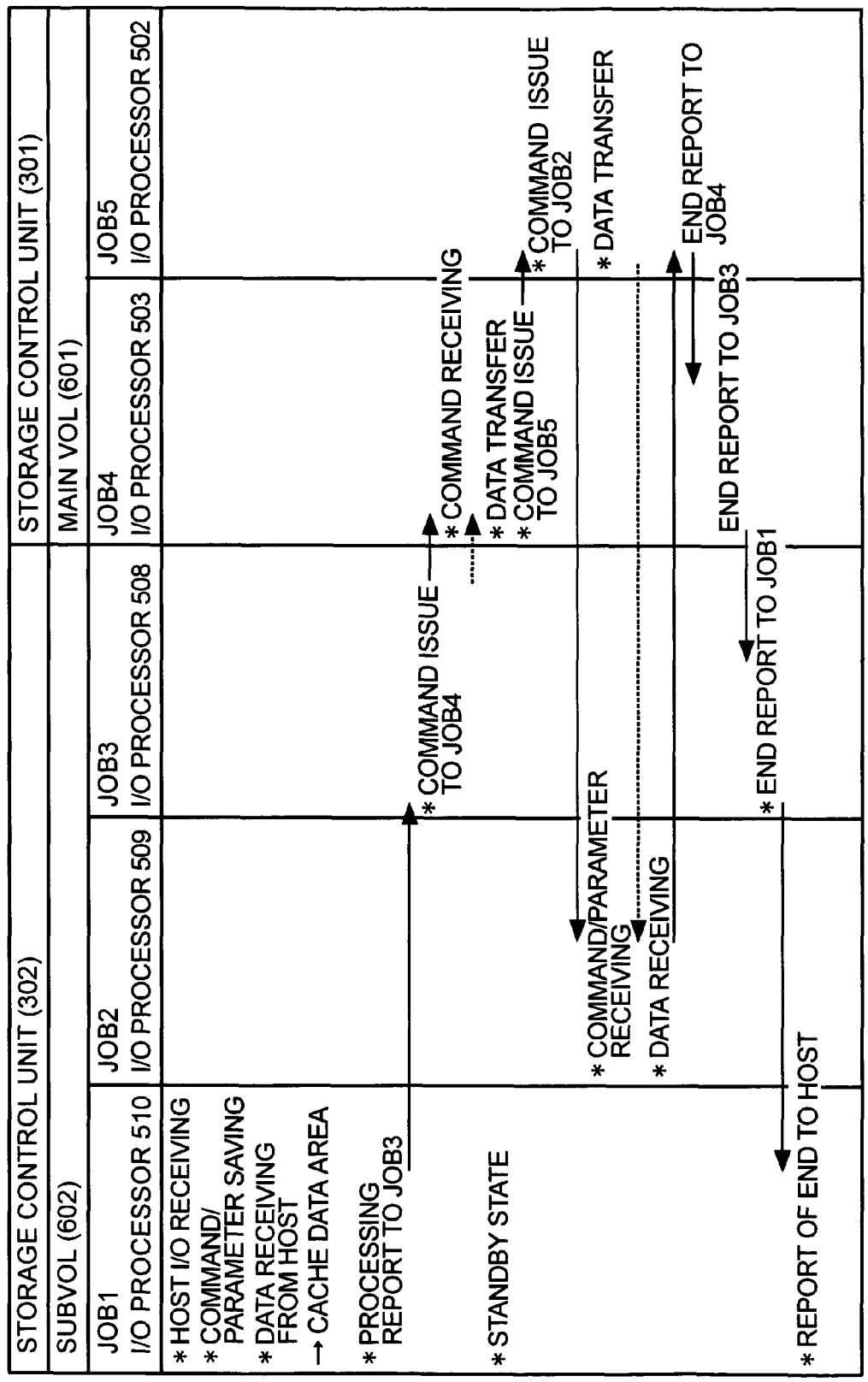
FIG. 16 is a sequential chart illustrating a relationship among the JOBs of I/O processors in the third example of the present invention.

FIG. 16 shows a sequential flow of the processings performed by the JOBs started by I/O processors in the subvolume 602 and the main volume 601 with use of the controlling method shown in FIGS. 11 through 15. The flow shown in FIG. 16 is almost the same as that shown in FIG. 8 except that the JOB started in the communication volume 603 is replaced with the JOB3 to be performed in the subvolume 602.

Also in this second example, data can be transferred asynchronously by, for example, replacing the communication volume shown in FIG. 9 with a subvolume.

If data received from the subvolume 602 through the host computer 102 is stored temporarily in the shared/cache memory 514, the data transfer requested as a data copy from the main volume 601 is omissible.

It is also possible to define the communication volume 603 in the shared/cache memory 514, not in the subvolume 602. If the communication volume 603 is defined in the shared/ache memory 514 such way, there is no need to write data in the subvolume 602. As a result, the response to the host computer is improved.

The third example of the present invention is to omit distinguishing between the main volume and the subvolume. In other words, both main volume and subvolume having been described above are handled as main volumes. The main volumes and the subvolumes excluded from I/O processings in other host computers are all assumed as main volumes between the host computers 101 and 102 or between the storage control units 301 and 302. On the other hand, main volumes and subvolumes that are not excluded from those I/O processings are all assumed as subvolumes 602 and processed, thereby the host computers 101 and 102 can perform I/O processings for those subvolumes while data redundancy is kept between those volumes. If a relationship between a main volume and a subvolume is decided at that time, the processing flow for the volumes come to conform to that shown in FIGS. 11 through 15. The distinctions between main host system and the sub-host or backup system remain, so that the processes for storing data are different for a write request that originates from the main host system and a write request that originates from the backup system, even though the two volumes are handled as main volumes, as described in greater details below.

Figure 17:
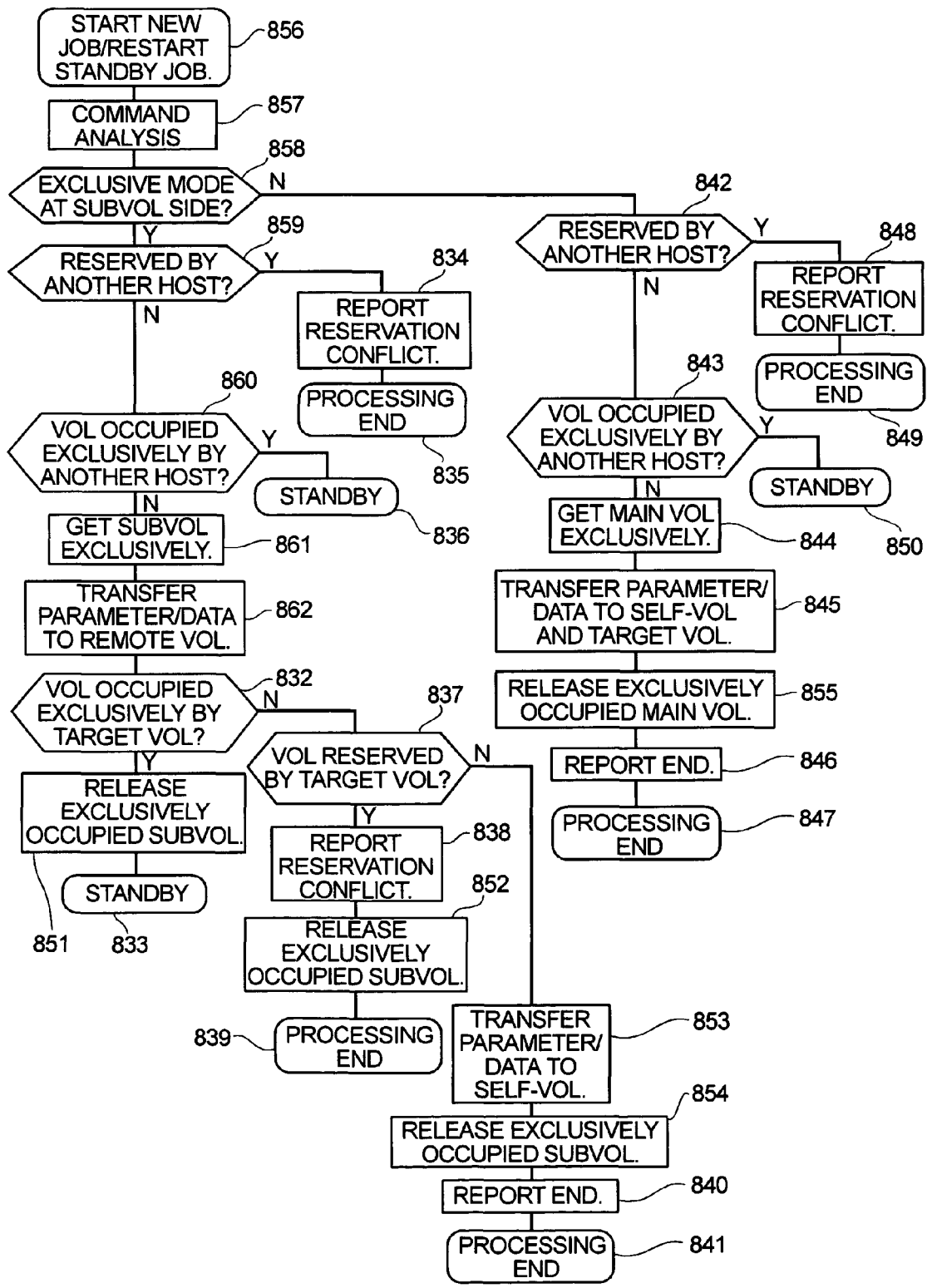
FIG. 17 is a flowchart of the processings in the third example of the present invention.

FIG. 17 shows a flowchart of the processings in this third example in which both main volume and subvolume are handled similarly. To realize this example, an exclusive mode is set for each pair of volumes beforehand. In other words, one of the mirrored volumes is defined as an exclusive main volume while the other is defined as an exclusive subvolume. Priority is given to the processing of a storage control unit privileged to obtain the exclusive main volume.

At first, a host computer starts an I/O JOB (step 856), then the processor makes a command analysis (step 857). After that, the processor checks the self-volume exclusive mode (step 858). If the volume is an exclusive subvolume, the processor checks if the volume is reserved by another host computer (step 859). If it is reserved, the processor reports a reservation conflict to the host computer (step 834) and terminates the processing (step 835). If it is not reserved, the processor checks if the volume is excluded by another host computer (step 860). If it is excluded, it means that the volume is accessed from the host computer. The processor thus enters the standby state (step 836). If it is not excluded, the processor obtains another exclusive subvolume (step 861).

After that, the processor transfers the necessary parameter or data received from the host computer to the target volume (step 862). At that time, the processor does not obtain any exclusive main volume yet, so that the processor must check the transfer result. If the transfer result denotes the target volume that is an exclusive one (step 832), it means that another host computer has already obtained the exclusive main volume. The processor thus releases the exclusive subvolume (step 851), thereby the JOB enters the standby state (step 833). If the transfer result denotes "the target volume that is reserved" (step 837), it means that the volume is reserved by another host computer by a slit second earlier. The processor thus releases the exclusive subvolume (step 852) and reports a reservation conflict to the host computer (step 838) and terminates the processing (step 839). If the transfer result is neither "excluded" nor "reserved", it means that the data is already transferred successfully to the target volume normally. Consequently, the processor also transfers the parameter or data received from the host computer to the self-volume (step 853) and resets the exclusive subvolume information (step 854), reports the end of the processing to the host computer (step 840), and terminates the processing (step 841).

The processor also checks if another host computer reserves the target volume even when the self-main volume is in the exclusive mode (step 842). If the volume is reserved, the processor sends a reservation conflict to the host computer (step 848) and terminates the processing (step 849). If the volume is not reserved, the processor checks if the volume is excluded by another host computer (step 843). It the volume is excluded, it means that the volume is accessed by the host computer exclusively. Consequently, the JOB enters the standby state once (step 850). If the volume is not excluded, the processor obtains an exclusive main volume (step 844). After that, the processor transfers the parameter or data received from the host computer to the self-volume and the target volume respectively (step 845). At that time, the processor has already obtained the exclusive main volume, so that the processor always terminates the transfer. In other words, even when the target volume is set as an exclusive one a split second earlier, because the self main volume is in the exclusive mode, the processor monitors the time until the target volume is reset from the exclusive mode. After that, the processor performs the processing. Then, the processor resets the exclusive main volume information (step 855) and reports the end of the processing (step 846) to the host computer, then terminates the processing (step 847).

Figure 19:
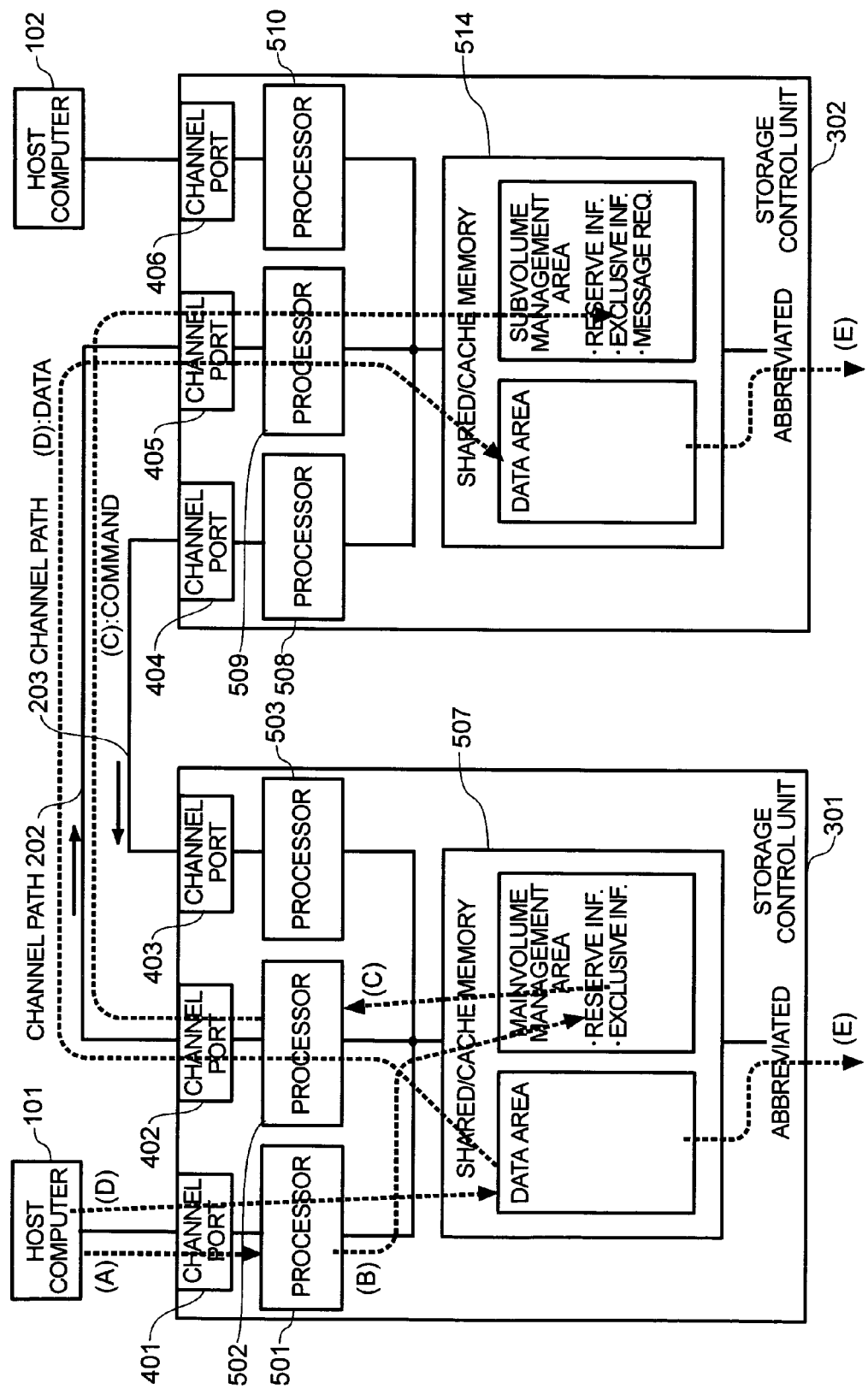
FIG. 19 is a block diagram of the storage system illustrating the data flow for a write request from a main host system in the third example of the present invention.
Figure 20:
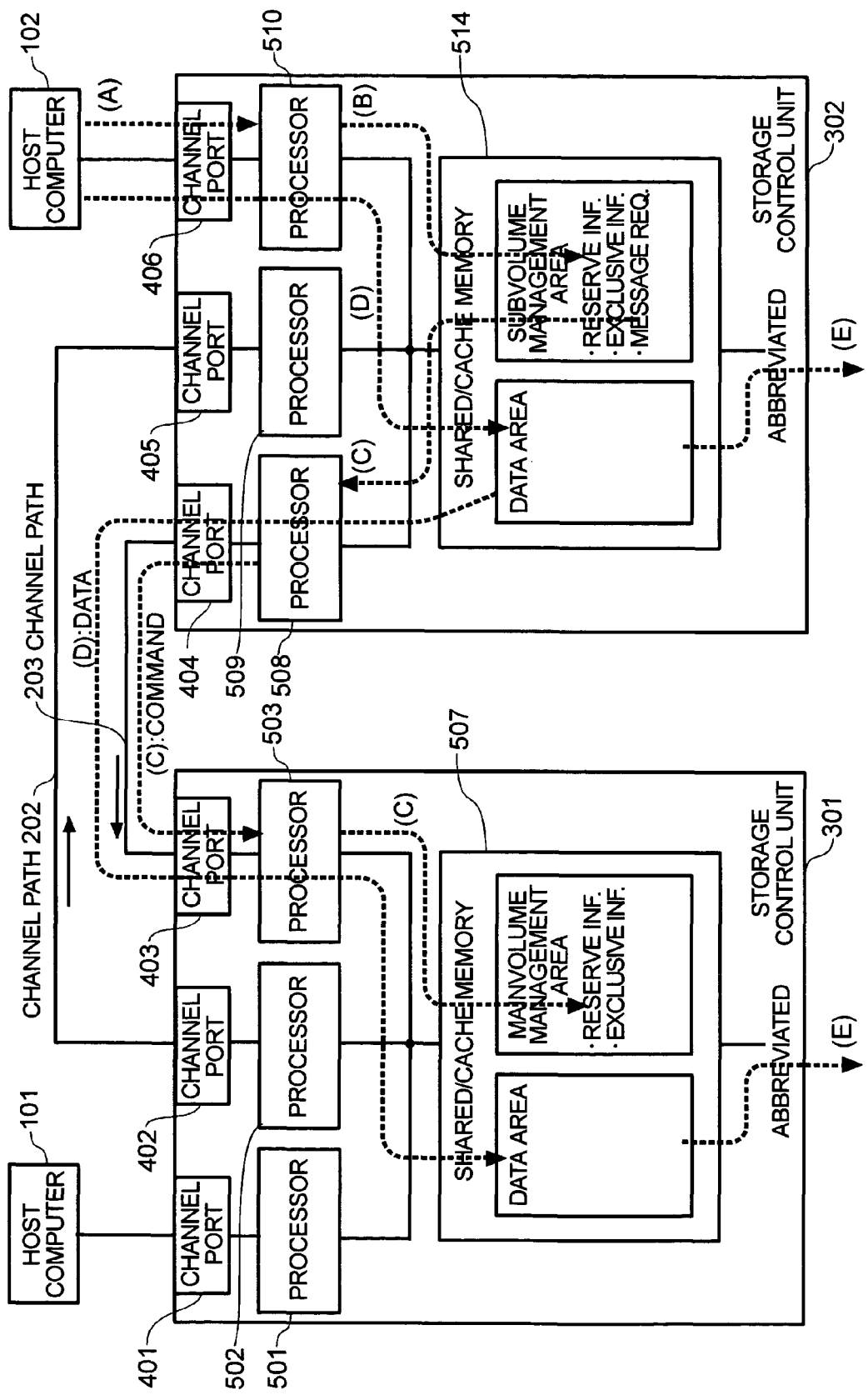
FIG. 20 is a block diagram of the storage system illustrating the data flow for a write request from a backup system in the third example of the present invention.

FIGS. 19 and 20 illustrate the data flow in the third example. In FIG. 19, the main host computer 101 starts an I/O command or request (A) and the I/O processor 501 of the main storage control unit 301 makes a command analysis. More specifically, the I/O processor 501 checks whether the status of the main volume 601 is reserved or exclusive. If the main volume 601 is neither reserved nor exclusive, then the I/O processor 501 obtains the exclusive status of the main volume 601 (B). The I/O processor 501 transfers the command to the sub-storage control unit 302 (C). The I/O processor 509 of the sub-storage control unit 302 obtains the exclusive status of the subvolume 602, which can be obtained definitely because of the exclusive status of the main volume 601 obtained by the I/O processor 501. The I/O processor 501 transfers the data/parameter from the main host computer 101 to the cache memory 507, and the I/O processor 502 transfers the same data/parameter to the sub-storage control unit 302 for the subvolume concurrently (D). The transfer of the data/parameter from the main host computer 101 (D) may occur simultaneously with the transfer of the command to the sub-storage control unit 302 (C). The data is transferred to both the main volume 601 and the subvolume 602 physically (E). If the I/O processor 501 reports good status to the main host computer 101 at the timing of termination of data transfer from the main host computer 101 while the data transfer to the subvolume 602 through the sub-storage control unit 302 is in progress, the operation is asynchronous.

In FIG. 20, the backup computer 102 starts an I/O command or request (A) and the I/O processor 510 of the main storage control unit 301 makes a command analysis. More specifically, the I/O processor 510 checks whether the status of the subvolume 602 is reserved or exclusive. If the subvolume 602 is neither reserved nor exclusive, then the I/O processor 508 transfers the command to the main storage control unit 301 (C). The I/O processor 503 checks whether the status of the main volume 601 is reserved or exclusive. If the main volume 601 is neither reserved nor exclusive, then the I/O processor 503 obtains the exclusive status of the main volume 601 and the I/O processor 508 obtains the exclusive status of the subvolume 602. The I/O processor 510 transfers the data/parameter from the backup computer 102 to the cache memory 514, and the I/O processor 508 transfers the same data/parameter to the main storage control unit 301 for the main volume concurrently (D). The data is transferred to both the main volume 601 and the subvolume 602 physically (E). If the I/O processor 510 reports good status to the backup computer 102 at the timing of termination of data transfer from the backup computer 102 while the data transfer to the main volume 601 through the main storage control unit 301 is in progress, the operation is asynchronous.

According to this example, data redundancy between a pair of object volumes is kept if the exclusive main volume is obtained. Consequently, when in reading, the main storage control unit can always transfer data from the self volume. Because data is read from the self volume such way, the overhead for the data transfer to such a pair of volumes is zero and the response to the host computer is improved. In addition, because there is no distinction between main volume and subvolume, this example is suitable for clustering.

In the first to third examples of the present invention, while the I/O processor 522 and the I/O processor 523 perform I/O processings for the main volume 601, the subvolume 602, and the communication volume 603 as shown in FIGS. 1 through 8, the I/O processors 501 to 503 and 508 to 510 may also perform those I/O processings.

Furthermore, while exclusive lines are used for the channel paths 202 and 203 in this example, other lines such as public lines, LANs, or the Internet may also be used for them.

Furthermore, in FIG. 1, if the communication volume 603 is connected to the storage control unit 301 separately from the main volume 601, the functions can be exchanged between the host computers 101 and 102, between the storage control units 301 and 302, and between the main volume 601 and the subvolume 602. Similarly, those functions may be exchanged in the second example.

According to the present invention, therefore, the sub-host or backup computer can perform I/O processings for the subvolume even when the subvolume is mirrored with the main volume while data redundancy with the main volume is kept.

What is claimed is:
1. A system for storing data, comprising:
  a first storage area to store data;
  a second storage area to store data;
  a first storage control unit configured to control the first storage area; and
  a second storage control unit configured to control the second storage area;
  wherein, in response to a first write request issued to write data in the first storage area, the first storage control unit is configured to write data associated with the first write request to the first storage area and to transfer the first write request to the second storage control unit, the second storage control unit being configured to write the data associated with the first write request to the second storage area; and
  wherein, in response to a second write request issued to write data in the second storage area, the second storage control unit is configured to transfer the second write request to the first storage control unit without writing data associated with the second write request to the second storage area prior to transferring the second write request to the first storage control unit.
2. The system according to claim 1 wherein, in response to the second write request issued to write data in the second storage area, the second storage control unit is configured to transfer the second write request to the first storage control unit prior to writing data associated with the second write request to the second storage area.

3. The system according to claim 1 wherein the first storage control unit is configured, in response to the transferred second write request from the second storage control unit, to write data associated with the second write request to the first storage area and to transfer the second write request to the second storage control unit.

4. The system according to claim 3 wherein the second storage control unit is configured, in response to the second write request transferred from the first storage control unit, to write the data associated with the second write request to the second storage area.

5. In a group of storage systems including a first storage system configured to process requests from a first host system and a second storage system configured to process requests from a second host system and to control a second storage area, the first storage system comprising:
 a first storage area to store data; and
 a first storage control unit configured to control the first storage area;
 wherein the first storage control unit is configured, in response to a first write request issued to write data in the first storage area from the first host system, to write data associated with the first write request to the first storage area; and
 wherein the first storage control unit is configured, in response to a second write request issued to write data in the second storage area by the second host system, to receive the second write request prior to writing data associated with the second write request to the second storage area.

6. The first storage system according to claim 5 wherein the first storage control unit is configured, in response to the second write request issued to write data in the second storage area by the second host system, to transfer the second write request to the second storage system to write the data associated with the second write request to the second storage area.

7. The first storage system according to claim 5 wherein the first storage control unit is configured, in response to the received second write request, to write data associated with the second write request to the first storage area and to transfer the second write request to the second storage system to write the data associated with the second write request to the second storage area.

8. In a group of storage systems including a first storage system configured to process requests from a first host system and to control a first storage area and a second storage system configured to process requests from a second host system, the second storage system comprising:
 a second storage area to store data; and
 a second storage control unit configured to control the second storage area;
 wherein the second storage control unit is configured, upon receipt from the first storage control unit of a first write request issued to write data in the first storage area from the first host system, to write data associated with the first write request to the second storage area; and
 wherein the second storage control unit is configured, in response to a second write request issued to write data in the second storage area from the second host system, to transfer the second write request to the first storage system to write data associated with the second write request to the first storage area prior to writing the data associated with the second write request to the second storage area.

9. The second storage system according to claim 8 wherein the second storage control unit is configured to receive the second write request from the first storage system.

10. The second storage system according to claim 9 wherein the second storage control unit is configured to write the data associated with the second write request to the second storage area in response to the second write request received from the first storage system.

11. A method of storing data in storage devices, the method comprising:
 in response to a first write request issued to write data in a first storage area, using a first storage control unit to write data associated with the first write request to the first storage area and transferring the first write request to a second storage control unit to write the data associated with the first write request to a second storage area; and
 in response to a second write request issued to write data in the second storage area, transferring the second write request from the second storage control unit to the first storage control unit prior to writing data associated with the second write request to the second storage area.

12. The method according to claim 11 wherein, in response to the second write request issued to write data in the second storage area, the second write request is transferred from the second storage control unit to the first storage control unit prior to writing data associated with the second write request to the second storage area.

13. The method according to claim 11 further comprising, in response to the transferred second write request from the second storage control unit to the first storage control unit, using the first storage control unit to write data associated with the second write request to the first storage area and to transfer the second write request to the second storage control unit.

14. The method according to claim 13 further comprising, in response to the second write request transferred from the first storage control unit, using the second storage control unit to write the data associated with the second write request to the second storage area.

15. A method of storing data, the method comprising:
 in response to a first write request issued to write data in a first storage area from a first host system, writing data associated with the first write request to the first storage area and transferring the first write request to a second storage control unit to write the data associated with the first write request to a second storage area; and
 in response to a second write request issued to write data in the second storage area by a second host system, receiving the second write request to write data associated with the second write request to the first storage area prior to writing the data associated with the second write request to the second storage area.

16. The method according to claim 15 further comprising, in response to the received second write request, writing data associated with the second write request to the first storage area and transferring the second write request to the second storage control unit to write the data associated with the second write request to the second storage area.

17. A method of storing data, the method comprising:
 upon receipt from a first storage control unit of a first write request issued to write data in a first storage area from a first host system, writing data associated with the first write request to a second storage area; and in response to a second write request issued to write data in the second storage area from a second host system, transferring the second write request to the first storage control unit to write data associated with the second write request to the first storage area prior to writing the data associated with the second write request to the second storage area.

18. The method according to claim 17 further comprising receiving the second write request from the first storage control unit.

19. The method according to claim 18 further comprising writing the data associated with the second write request to the second storage area in response to the second write request received from the first storage control unit.

* * * * *